US009525699B2

(12) United States Patent
Antonakakis et al.

(10) Patent No.: US 9,525,699 B2
(45) Date of Patent: *Dec. 20, 2016

(54) METHOD AND SYSTEM FOR DETECTING MALWARE

(71) Applicant: DAMBALLA, INC., Atlanta, GA (US)

(72) Inventors: Emmanouil Antonakakis, Dunwoody, GA (US); Robert Perdisci, Smyrna, GA (US); Wenke Lee, Atlanta, GA (US); Gunter Ollmann, Norcross, GA (US)

(73) Assignee: Damballa, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,796

(22) Filed: Sep. 30, 2013

(65) Prior Publication Data

US 2014/0101759 A1 Apr. 10, 2014

Related U.S. Application Data

(63) Continuation of application No. 12/985,140, filed on Jan. 5, 2011, now Pat. No. 8,578,497.

(60) Provisional application No. 61/292,592, filed on Jan. 6, 2010, provisional application No. 61/295,060, filed on Jan. 14, 2010.

(51) Int. Cl.
*H04L 29/06* (2006.01)
*G06F 15/173* (2006.01)
*G06F 21/57* (2013.01)
*H04L 29/12* (2006.01)

(52) U.S. Cl.
CPC ........... *H04L 63/145* (2013.01); *G06F 21/577* (2013.01); *H04L 29/12066* (2013.01); *H04L 61/1511* (2013.01); *H04L 63/1408* (2013.01); *H04L 29/06* (2013.01); *H04L 63/14* (2013.01)

(58) Field of Classification Search
CPC .. H04L 63/1425; H04L 63/1441; H04L 63/14; H04L 63/1416; H04L 29/06; H04L 29/12066; H04L 63/1408; H04L 63/145; H04L 61/1511; G06F 21/577
See application file for complete search history.

(56) References Cited

U.S. PATENT DOCUMENTS

| 4,843,540 A | 6/1989 | Stolfo |
| 4,860,201 A | 8/1989 | Stolfo et al. |
| 5,363,473 A | 11/1994 | Stolfo et al. |

(Continued)

FOREIGN PATENT DOCUMENTS

| WO | WO 02/37730 | 5/2002 |
| WO | WO 02/098100 | 12/2002 |

OTHER PUBLICATIONS

U.S. Appl. No. 14/015,611, filed Aug. 30, 2013, Pending.

(Continued)

*Primary Examiner* — Catherine Thiaw
(74) *Attorney, Agent, or Firm* — Pepper Hamilton LLP

(57) ABSTRACT

A system and method of analysis. NX domain names are collected from an asset in a real network. The NX domain names are domain names that are not registered. The real network NX domain names are utilized to create testing vectors. The testing vectors are classified as benign vectors or malicious vectors based on training vectors. The asset is then classified as infected if the NX testing vector created from the real network NX domain names is classified as a malicious vector.

10 Claims, 10 Drawing Sheets

(56) References Cited

U.S. PATENT DOCUMENTS

| | | |
|---|---|---|
| 5,497,486 A | 3/1996 | Stolfo et al. |
| 5,563,783 A | 10/1996 | Stolfo et al. |
| 5,668,897 A | 9/1997 | Stolfo |
| 5,717,915 A | 2/1998 | Stolfo et al. |
| 5,748,780 A | 5/1998 | Stolfo |
| 5,920,848 A | 7/1999 | Schutzer et al. |
| 6,401,118 B1 | 6/2002 | Thomas |
| 6,983,320 B1 | 1/2006 | Thomas et al. |
| 7,013,323 B1 | 3/2006 | Thomas et al. |
| 7,039,721 B1 | 5/2006 | Wu et al. |
| 7,069,249 B2 | 6/2006 | Stolfo et al. |
| 7,093,292 B1 | 8/2006 | Pantuso |
| 7,136,932 B1 | 11/2006 | Schneider |
| 7,152,242 B2 | 12/2006 | Douglas |
| 7,162,741 B2 | 1/2007 | Eskin et al. |
| 7,225,343 B1 | 5/2007 | Honig et al. |
| 7,277,961 B1 | 10/2007 | Smith et al. |
| 7,278,163 B2 | 10/2007 | Banzhof |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,483,947 B2 | 1/2009 | Starbuck |
| 7,487,544 B2 | 2/2009 | Schultz et al. |
| 7,536,360 B2 | 5/2009 | Stolfo et al. |
| 7,634,808 B1 | 12/2009 | Szor |
| 7,639,714 B2 | 12/2009 | Stolfo et al. |
| 7,657,935 B2 | 2/2010 | Stolfo et al. |
| 7,665,131 B2 | 2/2010 | Goodman |
| 7,698,442 B1 | 4/2010 | Krishnamurthy |
| 7,712,134 B1 | 5/2010 | Nucci et al. |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,818,797 B1 | 10/2010 | Fan et al. |
| 7,882,542 B2 | 2/2011 | Neystadt |
| 7,890,627 B1 | 2/2011 | Thomas |
| 7,913,306 B2 | 3/2011 | Apap et al. |
| 7,930,353 B2 | 4/2011 | Chickering |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone |
| 8,019,764 B1 | 9/2011 | Nucci |
| 8,074,115 B2 | 12/2011 | Stolfo et al. |
| 8,161,130 B2 | 4/2012 | Stokes |
| 8,170,966 B1 | 5/2012 | Musat et al. |
| 8,200,761 B1 | 6/2012 | Tevanian |
| 8,224,994 B1 | 7/2012 | Schneider |
| 8,260,914 B1 | 9/2012 | Ranjan |
| 8,341,745 B1 | 12/2012 | Chau |
| 8,347,394 B1 | 1/2013 | Lee |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2 | 9/2013 | Gabe |
| 8,631,489 B2 | 1/2014 | Antonakakis et al. |
| 8,826,438 B2 | 9/2014 | Perdisci et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0088646 A1 | 5/2004 | Yeager |
| 2004/0111636 A1 | 6/2004 | Baffes et al. |
| 2004/0187032 A1 | 9/2004 | Gels et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0039019 A1 | 2/2005 | Delany |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho |
| 2005/0281291 A1 | 12/2005 | Stolfo et al. |
| 2006/0015630 A1 | 1/2006 | Stolfo et al. |
| 2006/0031483 A1 | 2/2006 | Lund |
| 2006/0068806 A1 | 3/2006 | Nam |
| 2006/0075084 A1 | 4/2006 | Lyon |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0178994 A1 | 8/2006 | Stolfo et al. |
| 2006/0200539 A1 | 9/2006 | Kappler et al. |
| 2006/0212925 A1 | 9/2006 | Shull |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon |
| 2006/0253584 A1 | 11/2006 | Dixon |
| 2006/0259967 A1 | 11/2006 | Thomas et al. |
| 2006/0265436 A1 | 11/2006 | Edmond |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1 | 4/2007 | Olesinski |
| 2007/0083931 A1 | 4/2007 | Spiegel |
| 2007/0118669 A1 | 5/2007 | Rand et al. |
| 2007/0136455 A1 | 6/2007 | Lee et al. |
| 2007/0162587 A1 | 7/2007 | Lund et al. |
| 2007/0209074 A1 | 9/2007 | Coffman |
| 2007/0239999 A1 | 10/2007 | Honig et al. |
| 2007/0274312 A1 | 11/2007 | Salmela et al. |
| 2007/0294419 A1 | 12/2007 | Ulevitch |
| 2008/0028073 A1 | 1/2008 | Trabe et al. |
| 2008/0028463 A1 | 1/2008 | Dagon |
| 2008/0060054 A1 | 3/2008 | Srivastava |
| 2008/0060071 A1 | 3/2008 | Hennan |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jacoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0193293 A1 | 7/2009 | Stolfo et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1* | 10/2009 | Achan et al. .................. 726/22 |
| 2009/0254992 A1 | 10/2009 | Schultz et al. |
| 2009/0265777 A1 | 10/2009 | Scott |
| 2009/0282479 A1 | 11/2009 | Smith et al. |

(56) References Cited

U.S. PATENT DOCUMENTS

| | | |
|---|---|---|
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1* | 2/2010 | Shomura et al. ............ 370/252 |
| 2010/0037314 A1 | 2/2010 | Perdisci et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0077483 A1 | 3/2010 | Stolfo et al. |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0041179 A1 | 2/2011 | Stahlberg |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0167495 A1 | 7/2011 | Antonakakis et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0283361 A1 | 11/2011 | Perdisci et al. |
| 2012/0042381 A1 | 2/2012 | Antonakakis et al. |
| 2012/0079101 A1 | 3/2012 | Muppala et al. |
| 2012/0084860 A1 | 4/2012 | Cao et al. |
| 2012/0117641 A1 | 5/2012 | Holloway |
| 2012/0143650 A1 | 6/2012 | Crowley et al. |
| 2012/0198549 A1 | 8/2012 | Antonakakis |
| 2013/0191915 A1 | 7/2013 | Antonakakis et al. |
| 2013/0232574 A1 | 9/2013 | Carothers |
| 2014/0059216 A1 | 2/2014 | Jerrim |
| 2014/0068763 A1 | 3/2014 | Ward et al. |
| 2014/0068775 A1 | 3/2014 | Ward et al. |
| 2014/0075558 A1 | 3/2014 | Ward et al. |
| 2014/0090058 A1 | 3/2014 | Ward et al. |
| 2014/0101759 A1 | 4/2014 | Antonakakis et al. |
| 2014/0289854 A1 | 9/2014 | Mahvi |

OTHER PUBLICATIONS

U.S. Appl. No. 14/096,803, filed Dec. 4, 2013, Pending.
Manos Antonakakis et al., "Building a Dynamic Reputation System for DNS", 19th USENIX Security Symposium, Aug. 11-13, 2010 (17 pages).
Manos Antonakakis et al., "From Throw-Away Traffic to Bots: Detecting the rise of DGA-Based Malware", In Proceedings of the 21st USENIX Conference on Security Symposium (Security'12), (2012) (16 pages).
Yajin Zhou et al., "Dissecting Android Malware: Characterization and Evolution", 2012 IEEE Symposium on Security and Privacy, pp. 95-109 (2012).
File History of U.S. Appl. No. 11/538,212.
File History of U.S. Appl. No. 12/538,612.
File History of U.S. Appl. No. 12/985,140.
File History of U.S. Appl. No. 13/008,257.
File History of U.S. Appl. No. 13/205,928.
File History of U.S. Appl. No. 13/309,202.
File History of U.S. Appl. No. 13/358,303.
File History of U.S. Appl. No. 13/749,205.
File History of U.S. Appl. No. 14/010,016.
File History of U.S. Appl. No. 14/015,582.
File History of U.S. Appl. No. 14/015,621.
File History of U.S. Appl. No. 14/015,663.
File History of U.S. Appl. No. 14/015,704.
File History of U.S. Appl. No. 14/015,661.
File History of U.S. Appl. No. 14/096,803.
File History of U.S. Appl. No. 14/194,076.
File History of U.S. Appl. No. 14/305,998.
File History of U.S. Appl. No. 14/317,785.
File History of U.S. Appl. No. 14/304,015.
File History of U.S. Appl. No. 14/616,387.
File History of U.S. Appl. No. 14/668,329.
File History of U.S. Appl. No. 12/538,612, electronically captured from PAIR on Feb. 12, 2016 for Nov. 19, 2015 to Feb. 12, 2016.
File History of U.S. Appl. No. 13/205,928, electronically captured from PAIR on Feb. 12, 2016 for Nov. 19, 2015 to Feb. 12, 2016.
File History of U.S. Appl. No. 13/749,205, electronically captured from PAIR on Feb. 12, 2016 for Nov. 19, 2015 to Feb. 12, 2016.
File History of U.S. Appl. No. 14/015,582, electronically captured from PAIR on Feb. 12, 2016 for Nov. 19, 2015 to Feb. 12, 2016.
File History of U.S. Appl. No. 14/015,663, electronically captured from PAIR on Feb. 12, 2016 for Nov. 19, 2015 to Feb. 12, 2016.
File History of U.S. Appl. No. 14/015,704, electronically captured from PAIR on Feb. 12, 2016 for Nov. 19, 2015 to Feb. 12, 2016.
File History of U.S. Appl. No. 14/015,661, electronically captured from PAIR on Feb. 12, 2016 for Nov. 19, 2015 to Feb. 12, 2016.
File History of U.S. Appl. No. 14/096,803, electronically captured from PAIR on Feb. 12, 2016 for Nov. 19, 2015 to Feb. 12, 2016.
File History of U.S. Appl. No. 14/305,998, electronically captured from PAIR on Feb. 12, 2016 for Nov. 19, 2015 to Feb. 12, 2016.
File History of U.S. Appl. No. 14/317,785, electronically captured from PAIR on Feb. 12, 2016 for Nov. 19, 2015 to Feb. 12, 2016.
File History of U.S. Appl. No. 15/019,272, electronically captured from PAIR on Feb. 12, 2016.
File History of U.S. Appl. No. 12/538,612, electronically captured from PAIR on Apr. 4, 2016 for Feb. 12, 2016 to Apr. 4, 2016.
File History of U.S. Appl. No. 13/205,928, electronically captured from PAIR on Apr. 4, 2016 for Feb. 12, 2016 to Apr. 4, 2016.
File History of U.S. Appl. No. 13/309,202, electronically captured from PAIR on Apr. 4, 2016 for Nov. 19, 2015 to Apr. 4, 2016.
File History of U.S. Appl. No. 14/015,582, electronically captured from PAIR on Apr. 4, 2016 for Feb. 12, 2016 to Apr. 4, 2016.
File History of U.S. Appl. No. 14/015,704, electronically captured from PAIR on Apr. 4, 2016 for Feb. 12, 2016 to Apr. 4, 2016.
File History of U.S. Appl. No. 14/194,076, electronically captured from PAIR on Apr. 4, 2016 for Nov. 19, 2015 to Apr. 4, 2016.
File History of U.S. Appl. No. 14/305,998, electronically captured from PAIR on Apr. 4, 2016 for Feb. 12, 2016 to Apr. 4, 2016.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network-Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in the Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).

(56) References Cited

OTHER PUBLICATIONS

Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
File History of U.S. Appl. No. 13/205,928, electronically captured from PAIR on Jul. 25, 2016 for Apr. 4, 2016 to Jul. 25, 2016.
File History of U.S. Appl. No. 14/096,803, electronically captured from PAIR on Jul. 25, 2016 for Feb. 12, 2016 to Jul. 25, 2016.
File History of U.S. Appl. No. 14/317,785, electronically captured from PAIR on Jul. 25, 2016 for Feb. 12, 2016 to Jul. 25, 2016.
File History of U.S. Appl. No. 14/616,387, electronically captured from PAIR on Jul. 25, 2016 for Jun. 22, 2015 to Jul. 25, 2016.
File History of U.S. Appl. No. 14/668,329, electronically captured from PAIR on Jul. 25, 2016 for Jun. 22, 2015 to Jul. 25, 2016.
Mekky et al. (Detecting Malicious HTTP Redirections Using Trees of User Browser Activity, IEEE INFOCOM 2014, pp. 1159-1167).

\* cited by examiner

FIGURE 6

$1^{ST}$: The average of domain name length $2^{nd}$: The standard deviation of the domain name length $3^{rd}$: The number of difference TLDs $4^{th}$: The length of the domain name (excluding the TLD)

$5^{th}$: The median of the number of unique characters $6^{th}$: The average of the number of unique characters $7^{th}$: The standard deviation of the number of unique characters $8^{th}$: The median of unique 2-grams $9^{th}$: The average of unique 2-grams $10^{th}$: The standard deviation of unique 2-grams $11^{th}$: The frequency of .com TLDs over frequency of the rest TLDs $12^{th}$: The median of unique 3-grams $13^{th}$: The average of unique 3-grams $14^{th}$: The standard deviation of unique 3-grams $15^{th}$: The median count of unique TLDs $16^{th}$: The average count of unique TLDs $17^{th}$: The standard deviation count of unique TLDs

FIGURE 7

705 fpemcjfbv.com
odkigktjzv.biz
odkigktjzv.biz.inter1.com
1-sjn-sevans.ca1.intern2.com
xvoal.com
ymtaiwwprpq.biz
ymtaiwwprpq.biz.inter1.com
bcbkdfkg.net
bcbkdfkg.net.inter1.com
okxixsulas.net

| Class | FP | TP |
|---|---|---|
| conficker-B | 0.000539035127122 | 0.855427713857 |
| conficker-C | 0.0 | 0.998998998999 |
| conficker-A | 0.0265001796622 | 0.997997997998 |
| sinowal | 0.0 | 1.0 |
| unknownBot | 0.00257842715943 | 1.0 |
| bobax | 0.00107807025424 | 1.0 |

FIGURE 10 www.cb3e557b.com
www.cba4772d.com
www.cc04aff3.com
www.cc9d59d7.com
www.cced67b5.com
www.cd4b4b03.com
www.cd6297c3.com
www.cdb20e03.com
www.cdf4da40.com → Sample from domain names that produce vectors that were
www.ce8c8da1.com  labeled as unknown for the Meta-Classifier. This set of
www.cecd6b2f.com  domain names gave us the initial seed for building the class
www.cee595e8.com  unknonBot.
www.cf1d0a91.com
www.d0188eeb.com
www.d0626118.com
www.d082b59f.com
www.d09a0042.com

METHOD AND SYSTEM FOR DETECTING MALWARE

CROSS-REFERENCED TO RELATED APPLICATIONS

This application is a Continuation of U.S. patent application Ser. No. 12/985,140 filed Jan. 5, 2011. which claims benefit of U.S. Provisional Patent Application No. 61/292,592 filed Jan. 6, 2010, and U.S. Provisional Patent Application No. 61/295,060 filed Jan. 14, 2010, the contents of which are incorporated herein by reference in their entireties.

BRIEF DESCRIPTION OF THE FIGURES

FIGS. 6-10 illustrate examples for detecting malware, according to several embodiments.

DESCRIPTION OF EMBODIMENTS OF THE INVENTION

Figure 1:
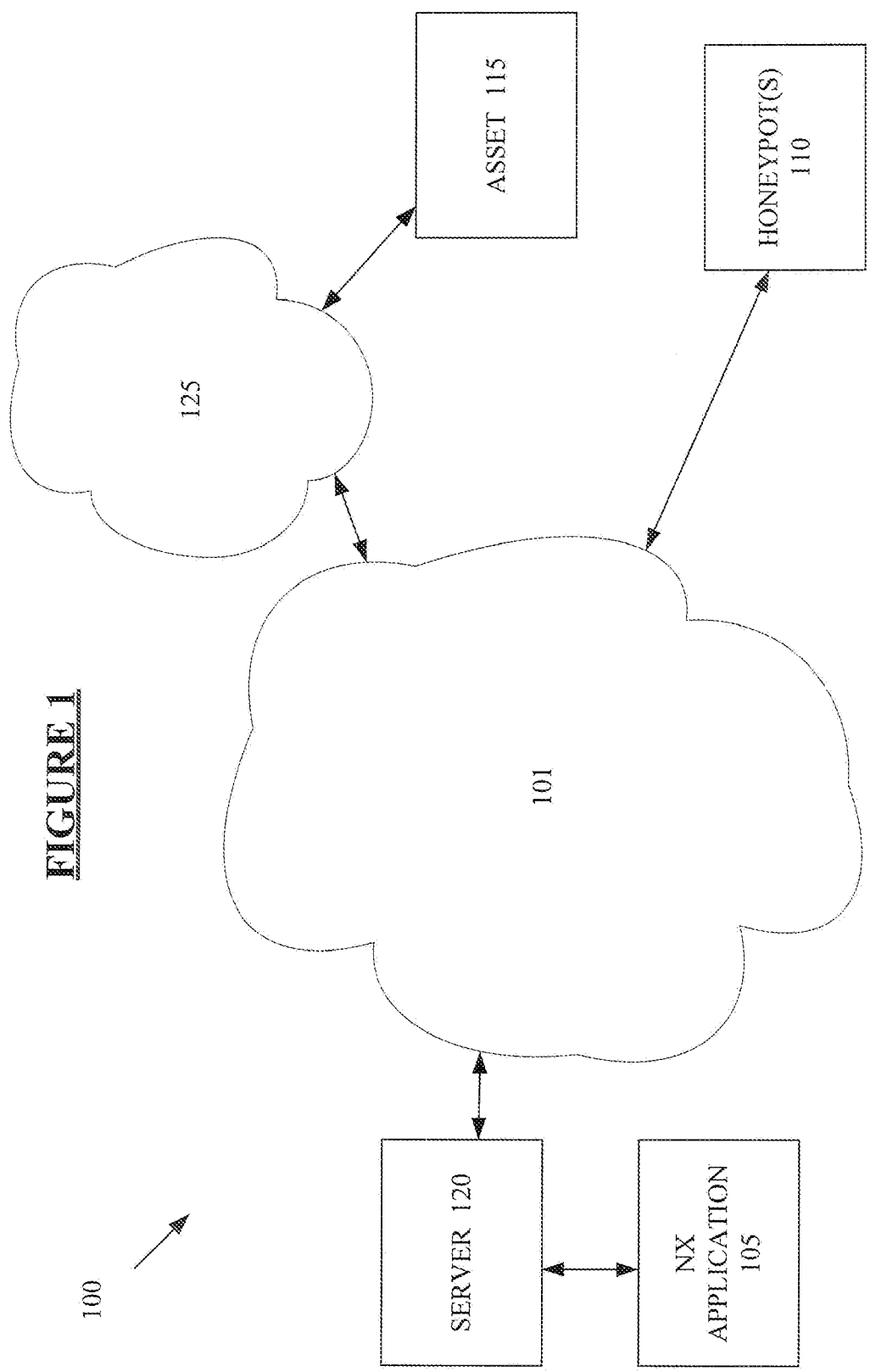
FIG. 1 illustrates a system for detecting malware, according to one embodiment.

FIG. 1 illustrates a system for detecting malware, according to one embodiment. FIG. 1 illustrates at least one network 101 (e.g., the Internet) connecting at least one NX application 105 (described below) on at least one server 120 to at least one honeypot 110 and at least one entity's network 125 (e.g., a private network of a company). The NX application 105 can determine if one or more assets 115 (e.g., computers) on the at least one entity's network 125 is infected with malware. It should be noted that the asset can be a simple asset (e.g., mainframe hardware, storage) or a complex asset (e.g., licensed software).

The determination of whether an asset is infected can comprise: collecting NX domain names from at least one honeypot and at least one asset; using the honeypot NX domain names to create training vectors; using the real network NX domain names to create testing vectors; classifying the testing vectors as benign vectors or malicious vectors; and classifying the at least one asset in the at least one real network as infected if the NX testing vector created from the real network NX domain names is classified as a malicious vector. (It should be noted that the testing vectors can be classified using: simple internal assets infected with known malware; simple internal assets infected with unknown malware; or complex internal network assets; or any combination thereof.)

NX domain name information is useful because some malware takes advantage of existing domain name system (DNS) services such as free domain testing (e.g., determining whether a new domain name is available). Such malware can use a domain name generator that employs a seed, such as the date, together with an algorithm to generate a set of domain names. The command and control (C&C) can try to register the generated domain names until a registrable subset of domain lames has been identified. An infected computer can then use those daily-generated set of domain names in order to establish a new communication channel with the C&C. The victim computers will employ the same seed (i.e. date) and algorithm to generate the same set of domain names. The victim computers will then use the generated domain names in attempts to contact the C&C computer. Eventually, each victim computer will find a domain name that was registered for the C&C computer to enable daily communication between the C&C computer and the victim computers. By changing the domain name for the C&C computer (e.g., daily), it becomes difficult to statically black list the domain names or the IP addresses of the C&C computer(s).

Thus, malware which uses the above domain name resolution to establish communication with a C&C can produce many NX-Domains (NXs), which can be domain names that have not been registered with an authoritative DNS and can be observable at a recursive DNS server ("RDNS"). RDNS servers map domain names to IP addresses, also called "resolving DNS queries". If such a mapping between a domain name and an IP address doesn't exist, the RNDS can send back to the initiator of the DNS query a "Non-Existence" response. The Non-Existence response can indicate that the domain name does not have an IP address, and is thus an NX-Domain (NX). Monitoring the NXs observable at a RDNS can provide the ability to collect all possible NXs generated from all computers connected to the RDNS.

Figure 2:
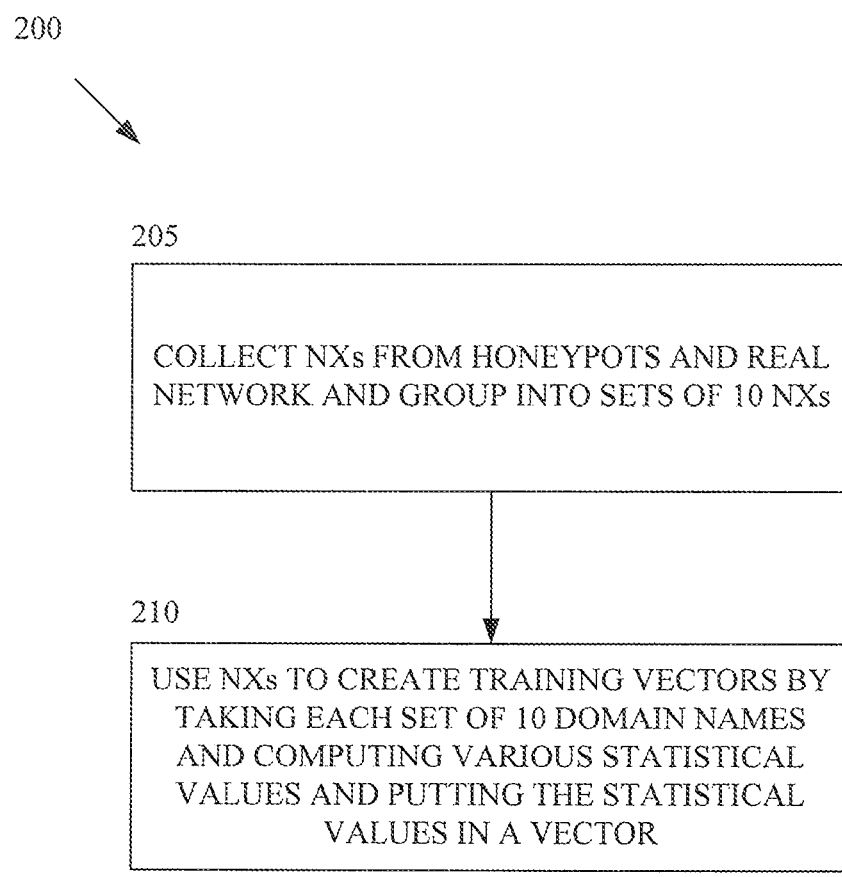
FIGS. 2-4 illustrate a method for detecting malware, according to one embodiment.

FIG. 2 illustrates a method for creating training vectors, according to one embodiment. Referring to FIG. 2, in 205, malware NXs can be collected from at least one honeypot (e.g., an Internet-attached server that acts as a decoy, luring in potential hackers in order to study their activities and monitor how they are able to break into a system) by an NX application 105 and grouped into sets of for example, 10.

Figure 5:
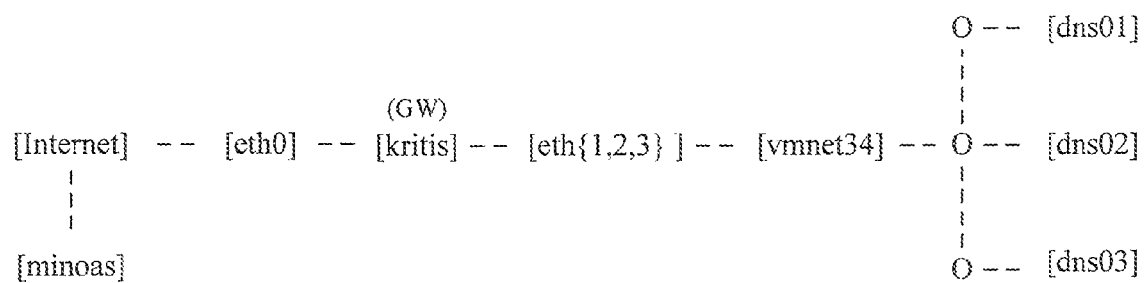
FIG. 5 illustrates various elements involved in domain name resolution.

The malware NXs can be collected so that a classifier can be trained in a controlled environment to recognize different categories of infected computers. For example, FIG. 5 illustrates a honeypot network configuration. In this example, the virtual machine names "kritis" operates as an internal, virtual gateway for the virtual machines dns01, dns02 and dns03, which are infected with malware (e.g., sinowal worm, bobax worm). By monitoring the DNS traffic that originates from infected virtual machines dns01, dns02, and dns03, a pure seed of malware domain names can be obtained.

In FIG. 5, the computer called "minoas" can act as an open recursive DNS ((ORDNS), which can be a rDNS server willing to resolve a domain name for any host in the Internet—inside or outside its network) and as an authoritative DNS server for root DNS servers. By doing this, the minoas computer can provide NXs that appear to originate from the root DNS servers. This can force the malware to lookup the next domain name and not stop probing since the minoas computer does not allow the malware to contact the root servers. As indicated earlier, the malware needs to make contact with the C&C at least one time during a set period (e.g., daily). Thus, by providing NX answers to any domain name that the malware requests, the "minoas" computer can cause the malware to keep looking up all the generated domain names (e.g., 10,000 ) because no successful C&C connection will take place. In this way, all 10,000 domain names can be observed and can be used to train a statistical class that can identify malware based only on this traffic.

Referring again to FIG. 5, the "kritis" computer can be configured to give free Internet access to the dns01, dns02, and dns03 computers for one hour, and for the next eight hours to redirect the DNS traffic to the "minoas" computer. A simple IP table firewall "rotating rule" at the gateway point (e.g., at the "kritis" computer) can be used to do this.

The VMNET 34 computer in FIG. 5 can be a virtual network connection between the virtual machines dns01, dns02, and dns03, and the virtual gateway "kritis".

Referring back to FIG. 2, in 210, training vectors can be created by taking each set of for example, 10 domain names and computing various statistical values and putting the various statistical values in a vector. Example statistics are illustrated in FIG. 6, which is described in more detail below.

Those of ordinary skill in the art will see that training vectors can be created in many other ways, in addition to collecting NXs from honeypots, as described above.

Figure 3:
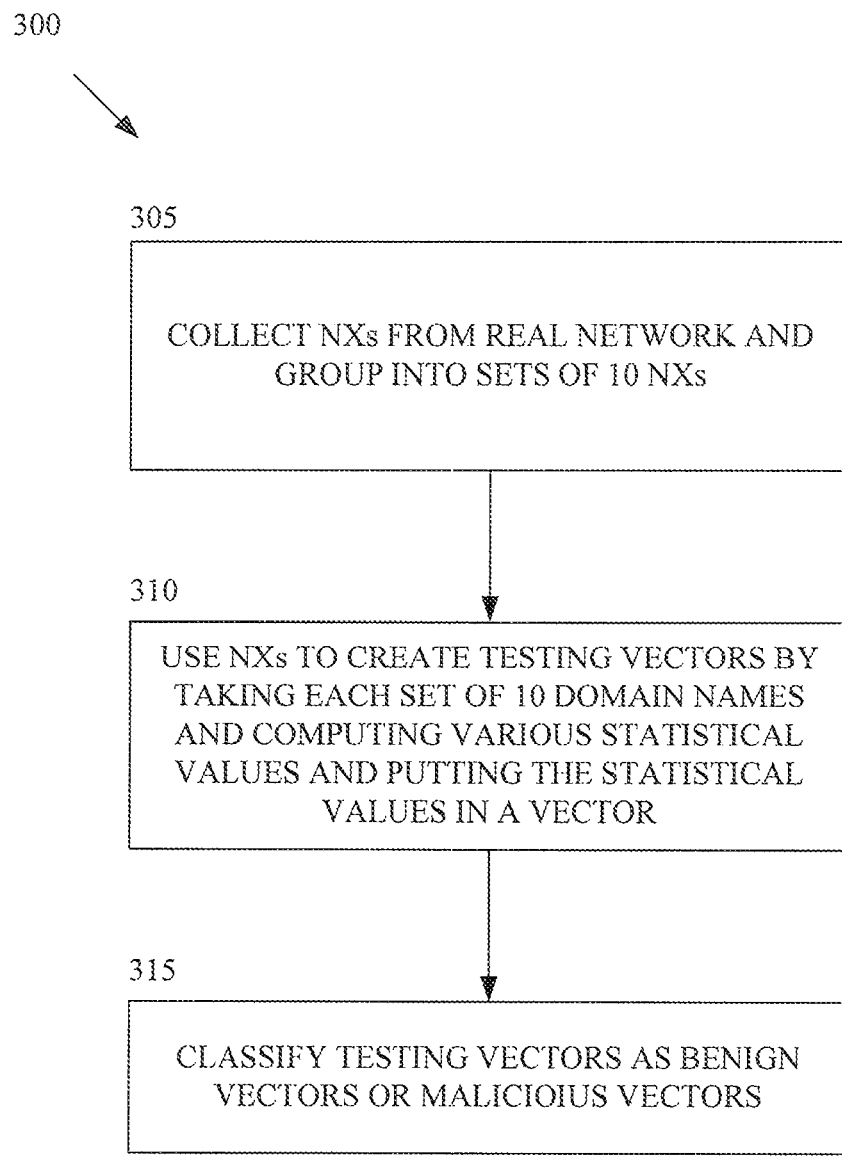
Figure 4:
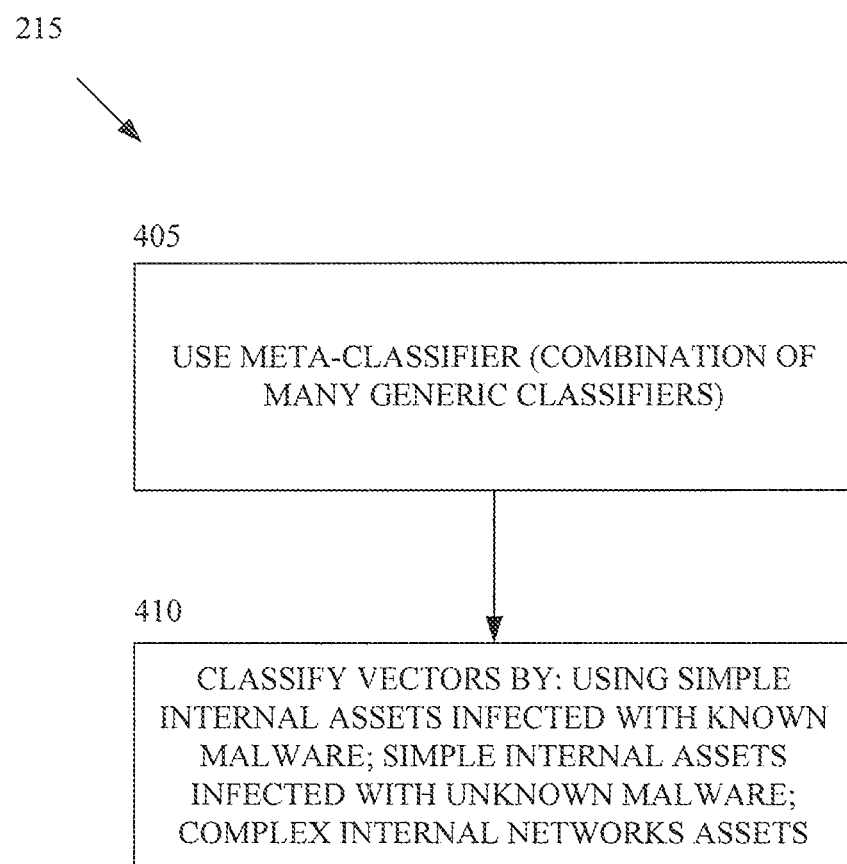
Figure 8:
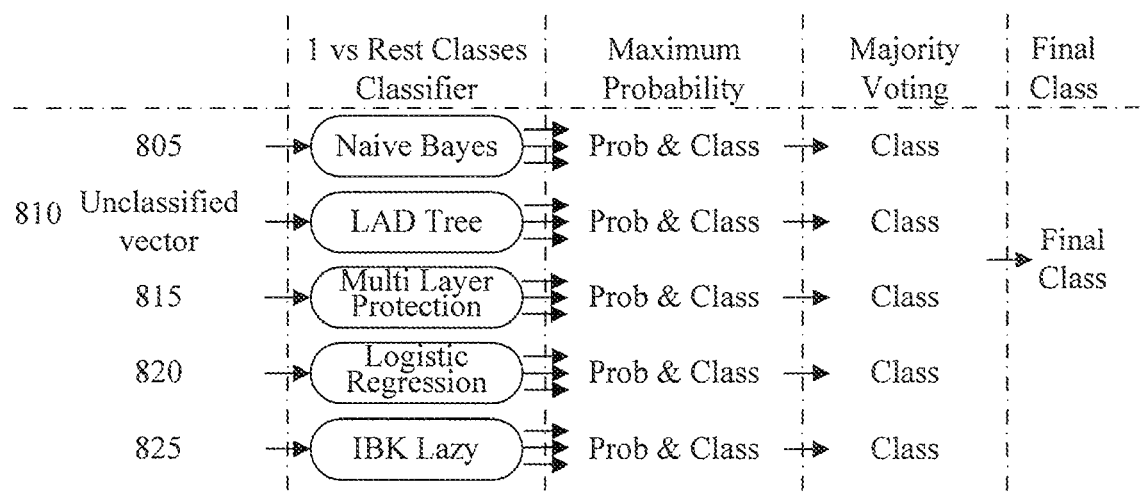

FIG. 3 illustrates a method for creating testing vectors, according to one embodiment. In 305, NXs are collected from a real network. In 310, the NXs from the real network can be used to create testing vectors by taking each set of, for example, 10 NX domain names and computing various statistical values and putting the various statistical values in a vector. (It should be noted that both the honeypot NXs and the real network NXs can be grouped in any number, and any algorithm can be used to group the sets.) It is not known if the testing NXs are malware or not. Thus, in 315, the testing vectors can be classified as benign vectors or malicious vectors by comparing testing vectors to training vectors. A classifier can use the knowledge obtained from the statistical information from the training vectors and compare it to the statistical information from the testing vectors to identify each different malware family in the testing NX vectors. FIG. 8 illustrates several types of classifiers that can be used to compare the vector information and identify different malware families. In particular, FIG. 8 illustrates the following classifiers: Naïve Bayes, LAD Tree, Multi-Layer Perception, Logistic Regression, and IBK Lazy. Those of ordinary skill in the art will see that many other types of classifiers can also be used. In addition, as explained in more detail below with respect to FIG. 8, a meta-classifier can use many different types of classifiers. In some embodiments, as also described in more detail below with respect to FIG. 8, a confidence score can also be given for each classifier, as well as for the meta-classifier.

For example, an absolute timing sequence, which can list the domain names in the order that they are received, can be used to group together an example set of ten NX domain names (e.g., from a real network):

fpemcjfbv.com
odkigktjzv.biz
odkigktjzv.biz.ebay.com
l-sjn-sevans.ca1.paypal.com
xvoal.com
ymtaiwwprpq.biz
ymtaiwwprpq.biz.ebay.com
bcbkdfkg.net
bcbkdfkg.net.ebay.com
okxixsulas.net An example of various statistical values that can be computed for the set of NX domain names is illustrated in FIG. 6. Note that many other types of statistical values can be computed, and that the vector can have more or less statistical values than that called for in FIG. 6 (e.g., 17). Thus, for the example of 10 NX domain names provided above, the following statistical values can be computed. It should be noted that some or all of these statistical values can be computed. In addition, other statistical values can be computed and used.

The average of domain name length (not including ".") (e.g., the domain name length of the first domain name is 13). [Value≈12.8333]

The standard deviation of the domain name length. [Value≈1.9507]

The number of different Top Level Domains (TLDs). [Value≈3.0]

The length of the longest domain name (excluding the TLD), [Value≈24.0]

The median of the frequency of each unique character across the entire set of domain names (e.g., the frequency of "o" across the entire set of 10 domain names above is 10). [Value≈2.0]

The average frequency of each unique character across the entire set of domain names. [Value≈2.2083]

The standard deviation of the frequency of each unique character across the entire set of domain names. [Value≈0.9565]

The median of the frequency of each unique 2-gram across the entire set of 10 domain names (e.g., the frequency of "fp" across the entire set of 10 domain names above is 1) (Note that if there is a "." (e.g., "v.c") between two characters, the frequency is counted as 0.) [Value≈0.9565]

The average of the frequency of each unique 2-gram across the entire set of 10 domain names. [Value≈1.0]

The standard deviation of the frequency of each unique 2-gram across the entire set of 10 domain names. [Value≈1.0]

The frequency of .com TLDs over the frequency of the other of TLDs. [Value≈1.5]

The median of the frequency of each unique 3-gram across the entire set of 10 domain names. [Value≈0.3333]

The average of the frequency of each unique 3-gram across the entire set of 10 domain names. [Value 1.0]

The standard deviation of the frequency of each unique 3-gram across the entire set of 10 domain names. [Value≈1.0]

The median count of unique TLDs (excluding .com). [Value≈2.0]

The average count of unique TLDs (excluding .com). [Value≈2.0]

The standard deviation for the different frequencies for each different TLD in the set of domain names. [Value≈2.0]

The various statistical values for each set of 10 domain names from the real network NXs can be put in a vector. An example illustrating the domain names being transformed to statistical vectors, using the statistical values set forth in FIG. 6, is illustrated in FIG. 7. Referring to FIG. 7, in 705, the 10 domain names used to create the vector are listed. Note that all of these domain names can come from one particular asset 115 (e.g., an infected computer) in the real network 125:

fpemcjfbv.com
odkigktjzv.biz
odkigktjzv.biz.inter1.com
l-sjn-sevans.ca1.intern2.com
xvoal.com
ymtaiwwprpq.biz
ymtaiwwprpq.biz.inter1.com
bcbkdfkg.net
bcbkdfkg.net.inter1.com
okxixsulas.net The 17 statistical values corresponding to the statistical values found in FIG. 6 are illustrated in the vector 710:

[12.8333, 1.9507, 3.0, 24.0, 2.0, 2.2083, 0.9565, 0.9565, 1.0, 1.0, 1.5, 0.3333, 1.0, 1.0, 0.0, 2.0, 2.0, 2.0].

The NX application 105 can then utilize a meta-classifier to classify the testing vectors. The meta-classifier is a hybrid classifier and can comprise several generic classifiers. The various generic classifiers can be used (e.g., in parallel) to capture various different statistical properties which can potentially lower false positives (FP) and increase true positives (TP).

For example, FIG. 8 illustrates a meta-classifier that is comprised of five different classifiers: the Naïve Bayes classifier 805, the LAD Tree classifier 810. the Multi-Layer Perception Neural Network classifier 815, the Logistic Regression classifier 820, and the IBK Lazy Classifier 825. The maximum probability includes the classification (given by a particular classifier for the malware) and the probability of this classification being correct. Thus, for example, five different types of classifiers can be used to classify the malware as follows:

Classifier 1 (Naive Bayes Meta.) is: notknown (Confidence: 1)
Classifier 2 (Multi Layer Per. Meta.) is: conficker-B (Confidence: 0.985572986223)
Classifier 3 (Logistic Regression Meta.) is: conficker-B (Confidence: 0.374297598072)
Classifier 4 (LADtree Meta.) is: conficker-B (Confidence: 0.220571723953)
Classifier 5 (Lazy IB1 Meta.) is conficker-B (Confidence: 1)

The majority voting can take the many classifications and determine which classification the majority of classifiers found. Thus, for the example above, conficker-B was the classification the majority of classifiers classified the malware as. The final class is the final classification based on the majority voting, which is conficker-B.

It should be noted that the meta-classifier can use any number and any type of known or unknown classifier, including, but not limited to, the above classifiers. The Naïve Bayes classifier can use estimator classes. Numeric estimator precision values can be chosen based on analysis of the training data. The LAD tree classifier can generate a multi-class alternating decision tree using a LogitBoost strategy. The Multi-Layer Perception Neural Network classifier can use back-propagation to classify instances. The Logistic Regression classifier can build linear logistic regression models. LogitBoost with simple regression can function as a base learner and can be used for fitting the logistic models. The IBK Lazy classifier can use normalized Euclidean distance to find the training instance closest o the given test instance, and can predict the same class as the training instance. If multiple instances have the same (smallest) distance to the test instance. the first one found can be used.

Additional information about all of the above classifiers can be found in Richard O. Duda et al., PATTERN CLASSIFICATION (2nd. Edition), which is herein incorporated by reference. Further information about the IBK Lazy classifier can be found in Niels Landwehr et al, LOGISTIC MODEL TREES (2005), which is also herein incorporated by reference.

For example, each classifier in the meta-classifier can classify vector 710 as follows:
Classifier 1 (Naive Bayes Meta.) is: notknown (Confidence: 1)
Classifier 2 (Multi Layer Per. Meta.) is: conficker-B (Confidence: 0.985572986223)
Classifier 3 (Logistic Regression Meta.) is: conficker-B (Confidence: 0.374297598072)
Classifier 4 (LADtree Meta.) is: conficker-B (Confidence: 0.220571723953))
Classifier 5 (Lazy IB1 Meta.) is: conficker-B (Confidence: 1)

Using the classification of the vector by each classifier, if a confidence threshold is set to be >=0.9 (note that this value can be set by the use), the meta-classifier can classify the vector (or statistical instance) as follow:

Instance 1 Meta classification detection result: conficker-B with majority voting value: 4 with confidence (med/std): (0.985572986223/0.345308923709). This means that a majority of four (out of five) of the classifiers found the vector to be classified as conficker-B. The median confidence score is the median of all five of the confidence scores, divided by the standard deviation of all five of the classifiers. It should be noted that, because the confidence threshold is set to be >=0.9, this number is only meaningful if the median confidence score is >=0.9.

FIG. 9 illustrates False Positive (FP) and True Positive (TP) classification results from the meta-classifier of FIG. 8 to one of six different malware classes: conficker-A, conficker-B, conficker-C, sinowal, bobax, and unknown. FIG. 9 indicates a FP value and a TP value for each type of malware. The FP rate is the False Positive detection rates for each different class. The TP rate is the True Positives detection rates for each different class. The FP rate can correspond to the percentage of vectors mistakenly classified as malicious which were actually benign. The TP rate corresponds to the percentage of vectors classified as malicious that were actually malicious. The following article, which is herein incorporated by reference, describes FP and TP rates in more detail: Axelsson, S., *The Base-Rate Fallacy and the Difficulty of Intrusion Detection*, ACM TRANS. INF. SYST. SECUR. 3, 3 (August 2000), 186-205.

It should be noted that the meta-classifier can be independent from the manner in which the NXs are collected. It is only necessary to keep a mapping between the internal asset that the NXs originated from. The detection flow is satisfied as long as the monitoring system in the real network collects NXs from the same internal asset and groups them into sets of 10 using the absolute timing sequence. This is because the classifier can be trained to detect such behavior. Thus, the trained classifier can utilize domain names collected in the same way in real time.

FIG. 9 also illustrates how domain names from known malware (e.g., sinowal, bobax, conficker) can be classified by the meta-classifier using information learned from the training set. Domain names that do not match the training set can be classified as "notknown" or "unknownBot". Hand verification or other methods can be used to classify the "notknown" domain names.

It should be noted that if many NXs are classified as "unknown", either a DNS issue causes such characterization, or the NXs are from malware where little or no information about the malware is known (e.g., a new worm). DNS issues can include a DNS outage or DNS misconfiguration. If a DNS issue is the cause of the high number of "unknown" classifications, the NXs can be classified as legitimate using for example, alexa.com, or a passive DNS feed. A passive DNS feed can be a technology which constructs zone replicas without cooperation from zone administrators, based on captured name server responses (see, e.g., F. Weimer, *Passive DNS Replications*, http://www.enyo.de/fw/software/dnslogger/2007, which is herein incorporated by reference). An example of a passive DNS feed is a DNSParse, which can be, for example, an implementation of the passive DNS technology by the University of Auckland in New Zealand (see, e.g., https://dnsparse.insec.auckland.ac.nz/dns/2007, which is herein incorporated by reference).

FIG. 10 illustrates an example of how to identify similar patterns in NXs and use those patterns to train a new class (e.g., an unknown-bot class). For example, reviewing the NXs of FIG. 10, a person or computer program could determine malware patterns such as, but not limited to: a size of 8 (after www) with a top level domain of .com.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method of analysis, comprising:
   collecting, using at least one processor circuit in communication with at least one database, NX domain names from at least one asset in at least one real network, the NX domain names being domain names that are not registered;
   utilizing, using the at least one processor circuit in communication with at least one database, statistical information about the NX domain names to create testing vectors; and
   classifying, using the at least one processor circuit in communication with at least one database, the testing vectors as benign vectors or malicious vectors based on training vectors by comparing the statistical information in the testing vectors to statistical information in training vectors, the statistical information comprising: an average of domain name length; a standard deviation of a domain name length; a number of different top level domains; a length of a domain name excluding a top level domain; a median of a number of unique characters; an average of a number of unique characters; a standard deviation of a number of unique characters; a median of unique 2-grams; an average of unique 2-grams; a standard deviation of unique 2-grams; a frequency of ,com top level domains over frequency of remaining to level domains; a median of unique 3-grams; an average of unique 3-grams; a standard deviation of unique 3-grams; a median count of unique top level domains; an average count of unique top level domains; or a standard deviation count of top level domains; or any combination thereof.

2. The method of claim 1, further comprising using at least one meta-classifier comprising at least two classifiers.

3. The method of claim 2, wherein the meta-classifier provides intelligence for identifying new malware.

4. The method of claim 1, wherein only NX domain traffic is utilized.

5. The method of claim 1, wherein similar patterns in NX domain names are identified and used to model new botnets.

6. A system of analysis, comprising:
   at least one processor circuit in communication with at least one database, the at least one processor circuit connected to at least one network and configured for:
   collecting NX domain names from at least one asset in at least one real network, the NX domain names being domain names that are not registered;
   utilizing statistical information about the NX domain names to create testing vectors; and
   classifying the testing vectors as benign vectors or malicious vectors based on training vectors by comparing the statistical information in the testing vectors to statistical information in training vectors, the statistical information comprising: an average of domain name length; a standard deviation of a domain name length; a number of different top level domains; a length of a domain name excluding a top level domain; a median of a number of unique characters; an average of a number of unique characters; a standard deviation of a number of unique characters; a median of unique 2-grams; an average of unique 2-grams; a standard deviation of unique 2-grams; a frequency of ,com top level domains over frequency of remaining to level domains; a median of unique 3-grams; an average of unique 3-grams; a standard deviation of unique 3-grams; a median count of unique top level domains; an average count of unique top level domains; or a standard deviation count of top level domains; or any combination thereof.

7. The system of claim 6, further comprising using at least one meta-classifier comprising at least two classifiers.

8. The system of claim 7, wherein the meta-classifier provides intelligence for identifying new malware.

9. The system of claim 6, wherein only NX domain traffic is utilized.

10. The system of claim 6, wherein similar patterns in NX domain names are identified and used to model new botnets.

* * * * *